(12) United States Patent
Shibata et al.

(10) Patent No.: US 12,149,338 B2
(45) Date of Patent: Nov. 19, 2024

(54) MULTIPLEX TRANSMISSION SYSTEM AND CONNECTION METHOD BETWEEN PORTS FOR MULTIPLEX TRANSMISSION SYSTEM

(71) Applicant: Nippon Telegraph and Telephone Corporation, Tokyo (JP)

(72) Inventors: Naotaka Shibata, Musashino (JP); Hiroko Nomura, Musashino (JP); Keita Takahashi, Musashino (JP); Tomoya Hatano, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 90 days.

(21) Appl. No.: 18/011,580

(22) PCT Filed: Jun. 29, 2020

(86) PCT No.: PCT/JP2020/025528
§ 371 (c)(1),
(2) Date: Dec. 20, 2022

(87) PCT Pub. No.: WO2022/003777
PCT Pub. Date: Jan. 6, 2022

(65) Prior Publication Data
US 2023/0291492 A1    Sep. 14, 2023

(51) Int. Cl.
*H04J 14/02* (2006.01)
*H04L 45/00* (2022.01)
*H04L 49/25* (2022.01)

(52) U.S. Cl.
CPC .......... *H04J 14/0267* (2013.01); *H04L 45/62* (2013.01); *H04L 49/25* (2013.01)

(58) Field of Classification Search
CPC ................. H04J 14/0267; H04Q 11/00; H04Q 2011/0039
See application file for complete search history.

(56) References Cited

U.S. PATENT DOCUMENTS

| 2002/0126342 A1* | 9/2002 | Wetzel | ............... | H04Q 11/0062 398/58 |
| 2004/0151421 A1* | 8/2004 | Yasue | ................ | H04Q 11/0005 385/16 |

(Continued)

OTHER PUBLICATIONS

Kani, "Optical Interface Standardization Trends for Access Networks," NTT Technical Journal, 2007, 19(7):46-49, 9 pages (with machine translation).

*Primary Examiner* — Nathan M Cors
(74) *Attorney, Agent, or Firm* — Fish & Richardson P.C.

(57) ABSTRACT

Provided is a multiplex transmission system capable of preventing occurrence of a mistake on connection of a client device to a multiplex transmission device. The multiplex transmission system includes: an extraction means configured to extract identification information from a signal inputted to a client port of each of a first multiplex transmission device 100 and a second multiplex transmission device 200; and a switch control unit 340 configured to control a switch unit 330 to connect the client port of the first multiplex transmission device 100 with the client port of the second multiplex transmission device 200 on the basis of a result of collation between identification information extracted from a signal inputted to the client port of the first multiplex transmission device 100 and identification information extracted from a signal inputted to the client port of the second multiplex transmission device 200.

8 Claims, 6 Drawing Sheets

(56) References Cited

U.S. PATENT DOCUMENTS

2005/0002386 A1\* 1/2005 Shiragaki ........... H04Q 11/0005
370/380
2011/0188853 A1\* 8/2011 Schimpe ............. H04J 14/0246
398/48

\* cited by examiner

MULTIPLEX TRANSMISSION SYSTEM AND CONNECTION METHOD BETWEEN PORTS FOR MULTIPLEX TRANSMISSION SYSTEM

CROSS-REFERENCE TO RELATED APPLICATIONS

This application is a National Stage application under 35 U.S.C. § 371 of International Application No. PCT/JP2020/025528, having an International Filing Date of Jun. 29, 2020.

The disclosure of the prior application is considered part of the disclosure of this application, and is incorporated by reference in its entirety into this application.

TECHNICAL FIELD

The present disclosure relates to a multiplex transmission system and an inter-port connection method of the multiplex transmission system.

BACKGROUND ART

Non Patent Literature 1 discloses a multiplex transmission system that multiplexes and transmits a plurality of signals between two points. Specifically, Non Patent Literature 1 discloses a multiplex transmission system that multiplexes a plurality of signals by using wavelength division multiplexing (WDM). A multiplex transmission device that demultiplexes a wavelength is installed at each of the two points where transmission is performed.

CITATION LIST

Non Patent Literature

Non Patent Literature 1: Optical interface standardization trend of access network, NTT Network Service Systems Laboratories, NTT Technical Journal, July 2007, p. 46-49

SUMMARY OF INVENTION

Technical Problem

In the multiplex transmission system as described in Non Patent Literature 1, for example, in a case where there is a plurality of client devices connected at each of the two points where transmission is performed, and the like, the multiplex transmission device at each point is provided with a plurality of client ports to which the client devices are connected. Conventionally, a correspondence between the plurality of client ports provided in the multiplex transmission devices at two points is fixed. Therefore, unless a client device that performs communication is correctly connected to a corresponding client port of the multiplex transmission device, communication between the corresponding client devices with each other cannot be established. When a client device is erroneously connected to a client port that is not corresponding, reconnection work on site occurs.

The present disclosure has been made to solve such a problem. An object is to provide a multiplex transmission system and an inter-port connection method of the multiplex transmission system capable of preventing occurrence of a mistake on connection of a client device to a multiplex transmission device provided with a plurality of client ports and suppressing occurrence of reconnection work on site.

Solution to Problem

A multiplex transmission system according to the present disclosure is a multiplex transmission system that multiplexes and transmits a plurality of signals between a first multiplex transmission device and a second multiplex transmission device, in which each of the first multiplex transmission device and the second multiplex transmission device includes a plurality of client ports to which a client device is connectable, and either one of the first multiplex transmission device and the second multiplex transmission device further includes: a switch unit configured to connect any one of a plurality of the client ports of the first multiplex transmission device with any one of a plurality of the client ports of the second multiplex transmission device; an extraction means configured to extract identification information from a signal inputted to each of the client ports of each of the first multiplex transmission device and the second multiplex transmission device; and a switch control unit configured to control the switch unit to connect a client port among the client ports of the first multiplex transmission device with a client port among the client ports of the second multiplex transmission device, based on a result of collation between the identification information extracted from a signal inputted to the client port among the client ports of the first multiplex transmission device and the identification information extracted from a signal inputted to the client port among the client ports of the second multiplex transmission device.

An inter-port connection method of a multiplex transmission system according to the present disclosure is a method for connecting a plurality of client ports provided in a first multiplex transmission device with a plurality of client ports provided in a second multiplex transmission device, in a multiplex transmission system that multiplexes and transmits a plurality of signals between the first multiplex transmission device and the second multiplex transmission device. The inter-port connection method includes: an extraction step of extracting identification information from a signal inputted to each of the client ports of each of the first multiplex transmission device and the second multiplex transmission device; and a switch control step of controlling a switch unit provided in either one of the first multiplex transmission device and the second multiplex transmission device and configured to connect any one of a plurality of the client ports of the first multiplex transmission device with any one of a plurality of the client ports of the second multiplex transmission device, in which the switch control step includes a connection step of controlling the switch unit to connect a client port among the client ports of the first multiplex transmission device with a client port among the client ports of the second multiplex transmission device, based on a result of collation between the identification information extracted from a signal inputted to the client port among the client ports of the first multiplex transmission device and the identification information extracted from a signal inputted to the client port among the client ports of the second multiplex transmission device.

Advantageous Effects of Invention

According to a multiplex transmission system and an inter-port connection method of the multiplex transmission system according to the present disclosure, there is an effect that it is possible to prevent occurrence of a mistake on connection of a client device to a multiplex transmission device provided with a plurality of client ports, and to suppress occurrence of reconnection work on site.

DESCRIPTION OF EMBODIMENTS

Embodiments for implementing a multiplex transmission system and an inter-port connection method of the multiplex transmission system according to the present disclosure will be described with reference to the accompanying drawings. In each figure, the same or corresponding parts are denoted by the same reference numerals, and redundant description is appropriately simplified or omitted. In the following description, for convenience, a positional relationship of each structure may be expressed with reference to the illustrated state. Note that the present disclosure is not limited to the following embodiments, and it is possible to freely combine the individual embodiments, modify any components of the individual embodiments, or omit any component of the individual embodiments within the scope not departing from the gist of the present disclosure.

First Embodiment

Figure 1:
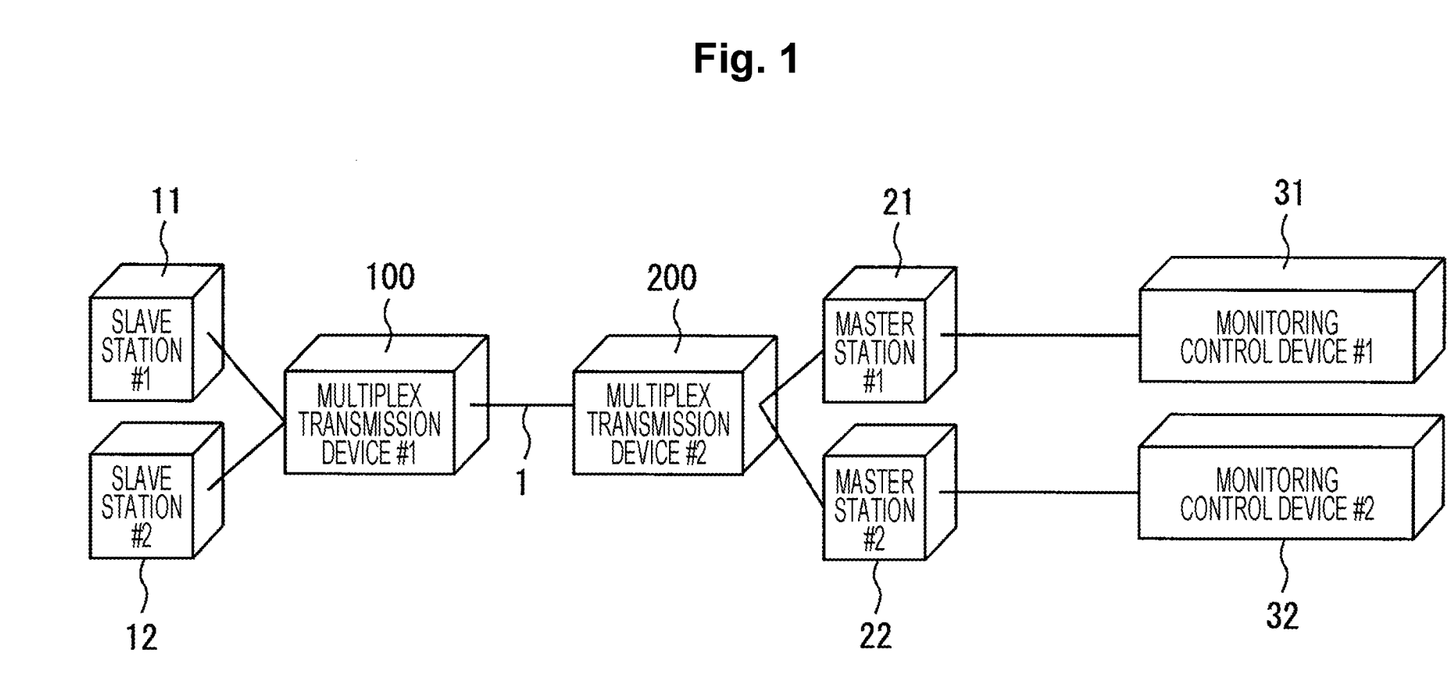
FIG. 1 is a diagram schematically illustrating an example of an overall configuration of a multiplex transmission system according to a first embodiment.
Figure 2:
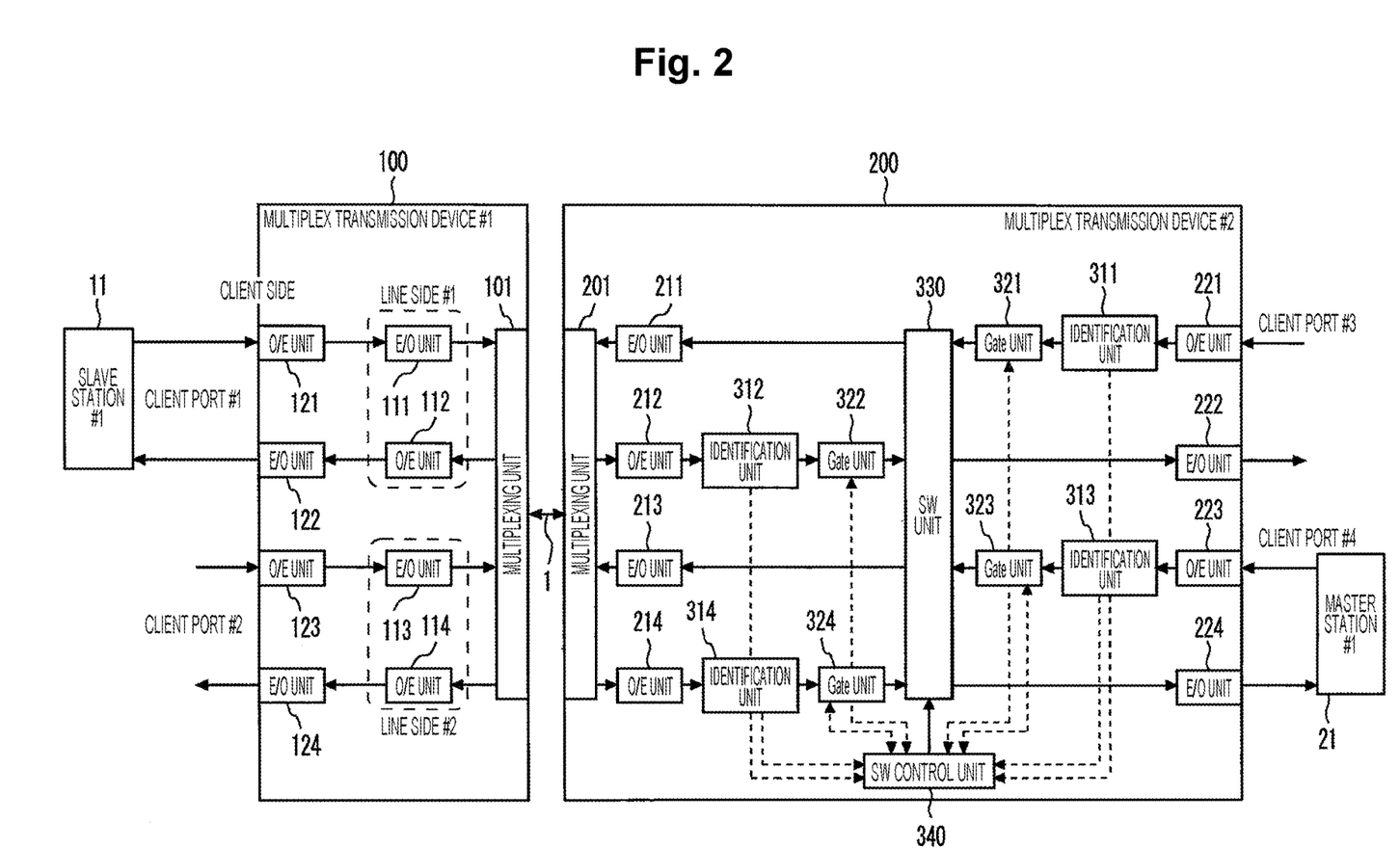
FIG. 2 is a block diagram illustrating a configuration of a multiplex transmission device included in the multiplex transmission system according to the first embodiment.
Figure 3:
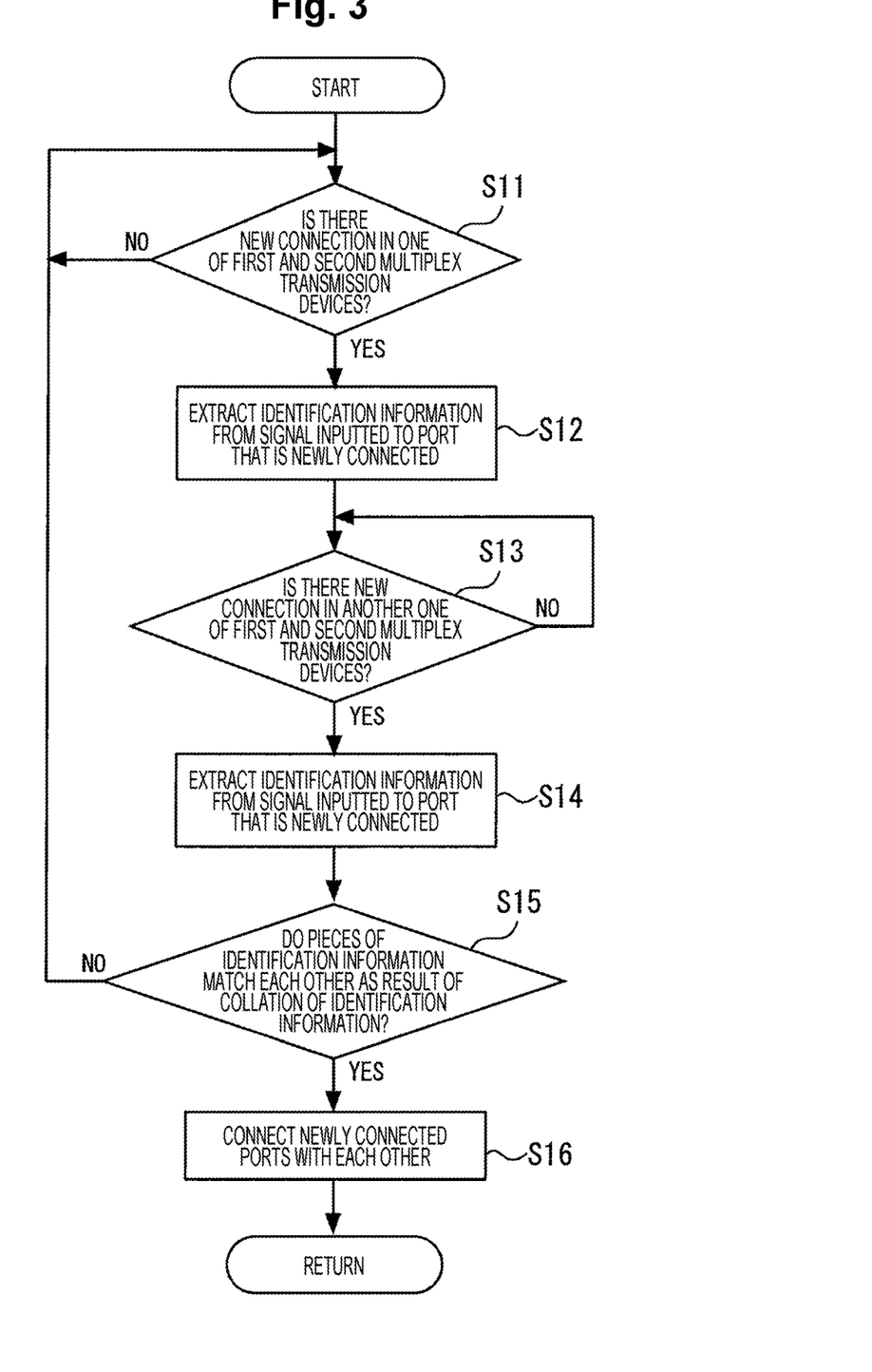
FIG. 3 is a flowchart illustrating a flow of an inter-port connection method of the multiplex transmission system according to the first embodiment.
Figure 4:
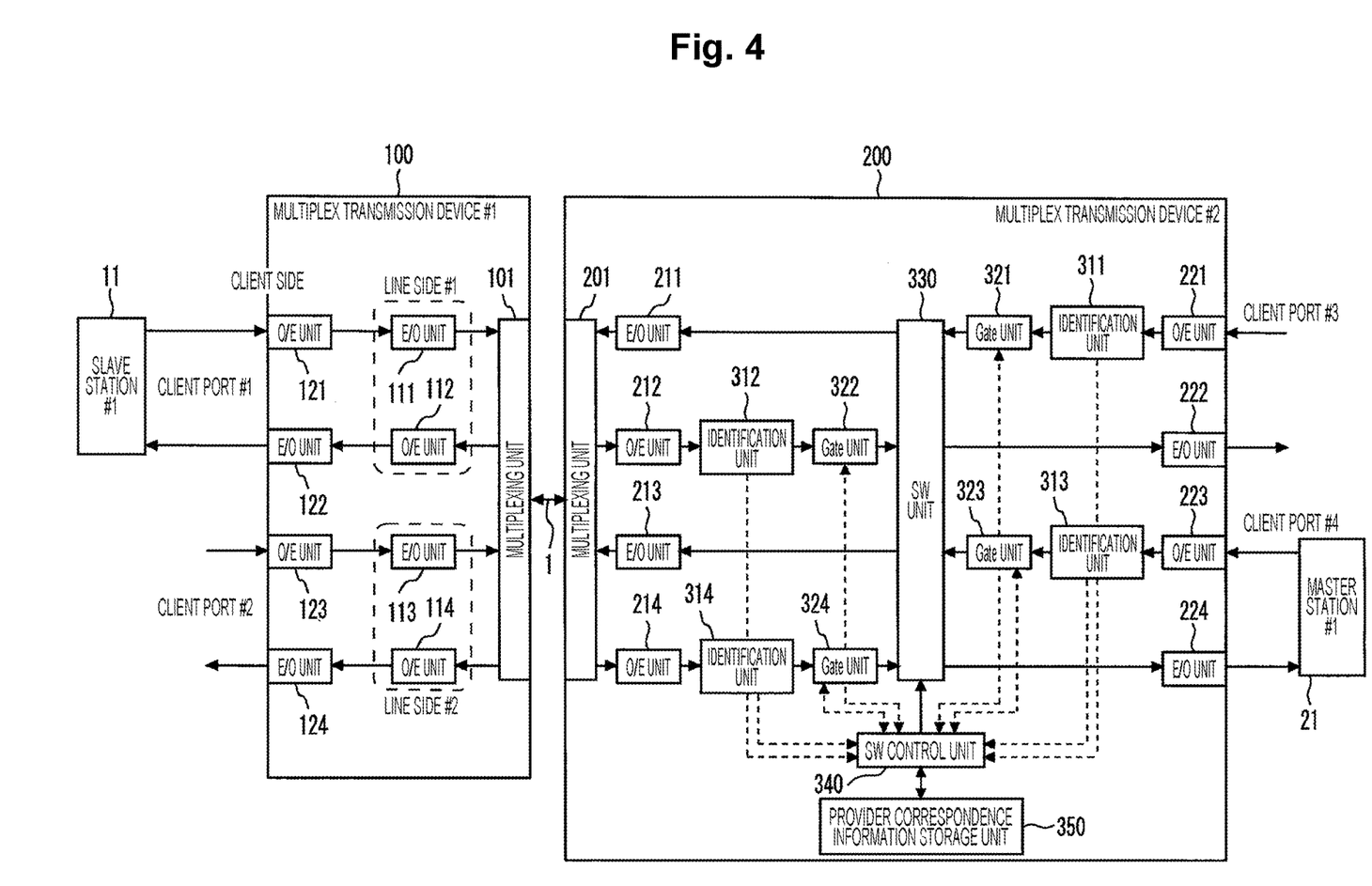
FIG. 4 is a block diagram illustrating a configuration of a modification of the multiplex transmission device included in the multiplex transmission system according to the first embodiment.

A first embodiment of the present disclosure will be described with reference to FIGS. 1 to 3. FIG. 1 is a diagram schematically illustrating an example of an overall configuration of a multiplex transmission system. FIG. 2 is a block diagram illustrating a configuration of a multiplex transmission device included in the multiplex transmission system. FIG. 3 is a flowchart illustrating a flow of an inter-port connection method of multiplex transmission system. FIG. 4 is a block diagram illustrating a configuration of a modification of the multiplex transmission device included in the multiplex transmission system.

As illustrated in FIG. 1, the multiplex transmission system according to the present embodiment includes a first multiplex transmission device 100 and a second multiplex transmission device 200. The multiplex transmission system of the present embodiment is a system that multiplexes and transmits a plurality of signals between the first multiplex transmission device 100 and the second multiplex transmission device 200. The multiplex transmission system according to the present disclosure can be applied to a system using various known signal multiplexing methods. Specific examples of the signal multiplexing method include wavelength division multiplex (WDM), frequency division multiplex (FDM), time division multiplex (TDM), and code division multiplex (CDM). Here, an example in a case where wavelength division multiplexing (WDM) is used will be described.

The first multiplex transmission device 100 and the second multiplex transmission device 200 are communicably connected by an optical fiber cable 1. By multiplexing signals communicated between the first multiplex transmission device 100 and the second multiplex transmission device 200 via the optical fiber cable 1, it is possible to reduce the number of the optical fiber cables 1 required to transmit a plurality of signals between two points.

One or more slave stations are communicably connected to one of the first multiplex transmission device 100 and the second multiplex transmission device 200. One or more master stations are communicably connected to another one of the first multiplex transmission device 100 and the second multiplex transmission device 200. In the illustrated configuration example, a first slave station 11 and a second slave station 12, which are two slave stations, are connected to the first multiplex transmission device 100, and a first master station 21 and a second master station 22, which are two master stations, are connected to the second multiplex transmission device 200.

In the present embodiment, the first slave station 11 and the first master station 21 are base stations of a first mobile carrier. The second slave station 12 and the second master station 22 are base stations of a second mobile carrier. The first mobile carrier and the second mobile carrier are different mobile carriers (mobile communication providers). The first master station 21 of the first mobile carrier communicates with the first slave station 11 via the first multiplex transmission device 100, the optical fiber cable 1, and the second multiplex transmission device 200. Similarly, the second master station 22 of the second mobile carrier communicates with the second slave station 12 via the first multiplex transmission device 100, the optical fiber cable 1, and the second multiplex transmission device 200.

The first master station 21 is monitored by a remotely installed first monitoring control device 31. The second master station 22 is monitored by a remotely installed second monitoring control device 32. In the illustrated configuration example, control signals exchanged between the first slave station 11 and the first monitoring control device 31 are communicated via the first master station 21. Similarly, control signals exchanged between the second slave station 12 and the second monitoring control device 32 are communicated via the second master station 22. However, the first slave station 11 and the first monitoring control device 31, and the second slave station 12 and the second monitoring control device 32 may communicate with each other via the first multiplex transmission device 100, the second multiplex transmission device 200, and the optical fiber cable 1 without via the first master station 21 or the second master station 22.

In the present embodiment, it is assumed that a multiplex transmission system is applied to a mobile fronthaul of an open radio access network (O-RAN). In this case, the first master station 21 and the second master station 22 are a central unit (CU) and/or a distributed unit (DU) of a base station. Further, in this case, the first slave station 11 and the second slave station 12 correspond to radio units (RUs). Then, it is assumed that communication between the first master station 21 and the first slave station 11 and communication between the second master station 22 and the second slave station 12 use an interface defined by O-RAN Work Group 4 (ORAN-WG4).

In each of the first multiplex transmission device 100 and the second multiplex transmission device 200, two client ports are provided. For easy distinction, the two client ports provided in the first multiplex transmission device 100 are referred to as a first client port and a second client port, and the two client ports provided in the second multiplex transmission device 200 are referred to as a third client port and a fourth client port. Note that, in each figure, "first" is indicated by "#1", "second" is indicated by "#2", "third" is indicated by "#3", and "fourth" is indicated by "#4".

Next, configurations of the first multiplex transmission device 100 and the second multiplex transmission device 200 included in the multiplex transmission system of the present embodiment will be described with reference to FIG. 2. The master station and the slave station connected to the first multiplex transmission device 100 and the second multiplex transmission device 200 are collectively referred to as a client device here. As described above, each of the first multiplex transmission device 100 and the second multiplex transmission device 200 is provided with a plurality of client ports to which the client device is connectable.

The first multiplex transmission device 100 includes the first client port and the second client port. Then, the first client port of the first multiplex transmission device 100 is provided with a first client-side O/E unit 121 and a first client-side E/O unit 122. Further, the second client port of the first multiplex transmission device 100 is provided with a second client-side O/E unit 123 and a second client-side E/O unit 124. The first multiplex transmission device 100 further includes a first line-side E/O unit 111, a first line-side O/E unit 112, a second line-side E/O unit 113, and a second line-side O/E unit 114, and a first multiplexing unit 101.

An optical signal inputted to the first client port of the first multiplex transmission device 100 is converted into an electric signal in the first client-side O/E unit 121 and is outputted to the first line-side E/O unit 111. The first line-side E/O unit 111 converts the inputted electric signal into an optical signal and outputs to the first multiplexing unit 101. Further, an optical signal inputted to the second client port of the first multiplex transmission device 100 is converted into an electric signal in the second client-side O/E unit 123 and is outputted to the second line-side E/O unit 113. The second line-side E/O unit 113 converts the inputted electric signal into an optical signal and outputs to the first multiplexing unit 101.

The first multiplexing unit 101 multiplexes the optical signals inputted from the first line-side E/O unit 111 and the second line-side E/O unit 113. The optical signal multiplexed in the first multiplexing unit 101 is transmitted from the first multiplex transmission device 100 to the second multiplex transmission device 200 via the optical fiber cable 1.

Whereas, a multiplexed optical signal transmitted from the second multiplex transmission device 200 to the first multiplex transmission device 100 via the optical fiber cable 1 is inputted to the first multiplexing unit 101. The first multiplexing unit 101 separates the inputted multiplexed signal, and outputs to each of the first line-side O/E unit 112 and the second line-side O/E unit 114.

The first line-side O/E unit 112 converts the optical signal inputted from the first multiplexing unit 101 into an electric signal and outputs to the first client-side E/O unit 122. The first client-side E/O unit 122 converts the inputted electric signal into an optical signal and outputs to the first client port of the first multiplex transmission device 100. Further, the second line-side O/E unit 114 converts the optical signal inputted from the first multiplexing unit 101 into an electric signal and outputs to the second client-side E/O unit 124. The second client-side E/O unit 124 converts the inputted electric signal into an optical signal and outputs to the second client port of the first multiplex transmission device 100.

As described above, the first line-side E/O unit 111, the first line-side O/E unit 112, the first client-side O/E unit 121, and the first client-side E/O unit 122 correspond to the first client port of the first multiplex transmission device 100. Further, the second line-side E/O unit 113, the second line-side O/E unit 114, the second client-side O/E unit 123, and the second client-side E/O unit 124 correspond to the second client port of the first multiplex transmission device 100.

The second multiplex transmission device 200 includes the third client port and the fourth client port. The third client port of the second multiplex transmission device 200 is provided with a third client-side O/E unit 221 and a third client-side E/O unit 222. Further, the fourth client port of the second multiplex transmission device 200 is provided with a fourth client-side O/E unit 223 and a fourth client-side E/O unit 224. The third client-side O/E unit 221 and the third client-side E/O unit 222 correspond to the third client port of the second multiplex transmission device 200. The fourth client-side O/E unit 223 and the fourth client-side E/O unit 224 correspond to the fourth client port of the second multiplex transmission device 200.

The second multiplex transmission device 200 further includes a third line-side E/O unit 211, a third line-side O/E unit 212, a fourth line-side E/O unit 213, and a fourth line-side O/E unit 214, and a second multiplexing unit 201. Further, in the present embodiment, the second multiplex transmission device 200 further includes a first client-side identification unit 311, a first line-side identification unit 312, a second client-side identification unit 313, and a second line-side identification unit 314, and a first client-side gate unit 321, a first line-side gate unit 322, a second client-side gate unit 323, and a second line-side gate unit 324. Then, in the multiplex transmission system of the present embodiment, the second multiplex transmission device 200 further includes a switch unit 330 and a switch control unit 340.

The switch unit 330 can connect any one of the plurality of client ports of the first multiplex transmission device 100 with any one of the plurality of client ports of the second multiplex transmission device 200. The switch control unit 340 controls connection between client ports by the switch unit 330. That is, the switch control unit 340 outputs connection information to the switch unit 330. The connection information is information designating a client port of the second multiplex transmission device 200 that is to be a connection destination of a client port of the first multiplex transmission device 100. Alternatively, it can be said that the connection information is information designating a client port of the first multiplex transmission device 100 to be a connection destination of a client port of the second multiplex transmission device 200. Then, the switch unit 330 connects the client port of the first multiplex transmission device 100 with the client port of the second multiplex transmission device 200 in accordance with the designation by the connection information inputted from the switch control unit 340.

An optical signal inputted to the third client port of the second multiplex transmission device 200 is converted into an electric signal in the third client-side O/E unit 221, and is outputted to the switch unit 330 via the first client-side identification unit 311 and the first client-side gate unit 321. Further, an optical signal inputted to the fourth client port of the second multiplex transmission device 200 is converted into an electric signal in the fourth client-side O/E unit 223, and is outputted to the switch unit 330 via the second client-side identification unit 313 and the second client-side gate unit 323.

The switch unit 330 outputs the electric signal inputted from the third client-side O/E unit 221 via the first client-side gate unit 321 and the electric signal inputted from the fourth client-side O/E unit 223 via the second client-side gate unit 323, to the third line-side E/O unit 211 or the fourth line-side E/O unit 213 in accordance with the connection information from the switch control unit 340. The third line-side E/O unit 211 converts the inputted electric signal into an optical signal and outputs to the second multiplexing unit 201. The fourth line-side E/O unit 213 also converts the inputted electric signal into an optical signal and outputs to the second multiplexing unit 201.

The second multiplexing unit 201 multiplexes the optical signals inputted from the third line-side E/O unit 211 and the fourth line-side E/O unit 213. The optical signal multiplexed in the second multiplexing unit 201 is transmitted from the second multiplex transmission device 200 to the first multiplex transmission device 100 via the optical fiber cable 1.

Whereas, a multiplexed optical signal transmitted from the first multiplex transmission device 100 to the second multiplex transmission device 200 via the optical fiber cable 1 is inputted to the second multiplexing unit 201. The second multiplexing unit 201 separates the inputted multiplexed signal, and outputs to each of the third line-side O/E unit 212 and the fourth line-side O/E unit 214.

The third line-side O/E unit 212 converts the optical signal inputted from the second multiplexing unit 201 into an electric signal. The electric signal converted by the third line-side O/E unit 212 is outputted to the switch unit 330 via the first line-side identification unit 312 and the first line-side gate unit 322. Further, the fourth line-side O/E unit 214 also converts the optical signal inputted from the second multiplexing unit 201 into an electric signal. The electric signal converted by the fourth line-side O/E unit 214 is outputted to the switch unit 330 via the second line-side identification unit 314 and the second line-side gate unit 324.

The switch unit 330 outputs the electric signal inputted from the third line-side O/E unit 212 via the first line-side gate unit 322 and the electric signal inputted from the fourth line-side O/E unit 214 via the second line-side gate unit 324, to the third client-side E/O unit 222 or the fourth client-side E/O unit 224 in accordance with the connection information from the switch control unit 340. The third client-side E/O unit 222 converts the electric signal inputted from the switch unit 330 into an optical signal, and outputs to the third client port of the second multiplex transmission device 200. Further, the fourth client-side E/O unit 224 converts the electric signal inputted from the switch unit 330 into an optical signal, and outputs to the fourth client port of the second multiplex transmission device 200.

Here, a wavelength of the optical signal outputted from the first line-side E/O unit 111 to the first multiplexing unit 101 is the same as a wavelength of the optical signal inputted from the second multiplexing unit 201 to the third line-side O/E unit 212. Therefore, the signal outputted from the first line-side E/O unit 111 is inputted to the third line-side O/E unit 212. Then, a wavelength of the optical signal outputted from the third line-side E/O unit 211 to the second multiplexing unit 201 is the same as a wavelength of the optical signal inputted from the first multiplexing unit 101 to the first line-side O/E unit 112. Therefore, the signal outputted from the third line-side E/O unit 211 is inputted to the first line-side O/E unit 112.

Further, a wavelength of the optical signal outputted from the second line-side E/O unit 113 to the first multiplexing unit 101 is the same as a wavelength of the optical signal inputted from the second multiplexing unit 201 to the fourth line-side O/E unit 214. Therefore, the signal outputted from the second line-side E/O unit 113 is inputted to the fourth line-side O/E unit 214. Then, a wavelength of the optical signal outputted from the fourth line-side E/O unit 213 to the second multiplexing unit 201 is the same as a wavelength of the optical signal inputted from the first multiplexing unit 101 to the second line-side O/E unit 114. Therefore, the signal outputted from the fourth line-side E/O unit 213 is inputted to the second line-side O/E unit 114.

As described above, the third line-side E/O unit 211 and the third line-side O/E unit 212 of the second multiplex transmission device 200 correspond to the first client port of the first multiplex transmission device 100. Further, the fourth line-side E/O unit 213 and the fourth line-side O/E unit 214 of the second multiplex transmission device 200 correspond to the second client port of the first multiplex transmission device 100.

The first client-side identification unit 311, the first line-side identification unit 312, the second client-side identification unit 313, and the second line-side identification unit 314 are extraction means that extract identification information from signals inputted to the client ports of each of the first multiplex transmission device 100 and the second multiplex transmission device 200. The identification information extracted by the extraction means is outputted to the switch control unit 340.

The first line-side identification unit 312 extracts identification information included in a signal inputted from the third line-side O/E unit 212. In other words, the first line-side identification unit 312 extracts identification information from a signal inputted to the first client port of the first multiplex transmission device 100. The second line-side identification unit 314 extracts identification information included in a signal inputted from the fourth line-side O/E unit 214. In other words, the second line-side identification unit 314 extracts identification information from a signal inputted to the second client port of the first multiplex transmission device 100.

Further, the first client-side identification unit 311 extracts identification information included in a signal inputted from the third client-side O/E unit 221. In other words, the first client-side identification unit 311 extracts identification information from a signal inputted to the third client port of the second multiplex transmission device 200. Then, the second client-side identification unit 313 extracts identification information included in a signal inputted from the fourth client-side O/E unit 223. In other words, the second client-side identification unit 313 extracts identification information from a signal inputted to the fourth client port of the second multiplex transmission device 200.

In a configuration example illustrated in FIG. 2, the extraction means described above extracts a component carrier identifier (CC ID) as identification information, from a signal inputted to each client port. The component carrier identifier is a type of identifier defined in ORAN-WG4. The component carrier identifier is an identifier uniquely representing a carrier wave frequency. Different mobile carriers use different carrier wave frequencies from each other.

Therefore, different mobile carriers have different component carrier identifiers. Conversely, component carrier identifiers of signals used on the same mobile carrier are the same. Therefore, the mobile carrier and the component carrier identifier are in a one-to-one correspondence.

Next, control of the switch unit 330 by the switch control unit 340 in the multiplex transmission system according to the present embodiment will be described. The switch control unit 340 may be configured by a computer including a processor and a memory as hardware. The processor is also referred to as a central processing unit (CPU), a central processing device, a processing device, an arithmetic device, a microprocessor, a microcomputer, or a DSP. The memory corresponds to, for example, a nonvolatile or volatile semiconductor memory such as a RAM, a ROM, a flash memory, an EPROM, or an EEPROM, or a magnetic disk, a flexible disk, an optical disk, a compact disk, a mini disk, DVD, or the like.

In the memory of the switch control unit 340, a program as software is stored. Then, the switch control unit 340 implements the following functions as a result of executing preset processing with the processor executing the program stored in the memory, to cause cooperation between the hardware and the software.

The switch control unit 340 collates identification information extracted from a signal inputted to the client port of the first multiplex transmission device 100 with identification information extracted from a signal inputted to the client port of the second multiplex transmission device 200. Then, the switch control unit 340 controls the switch unit 330 to connect the client port of the first multiplex transmission device 100 with the client port of the second multiplex transmission device 200 on the basis of a collation result of the identification information. As described above, the component carrier identifier serving as the identification information and the mobile carrier are in a one-to-one correspondence. Therefore, the switch control unit 340 outputs, to the switch unit 330, connection information designating connection between the client port of the first multiplex transmission device 100 and the client port of the second multiplex transmission device 200, in which the component carrier identifier serving as the identification information matches. Then, the switch unit 330 connects the client ports with each other in which the component carrier identifier matches, in accordance with the connection information inputted from the switch control unit 340.

Here, a signal inputted to the first client-side identification unit 311 is buffered in the first client-side gate unit 321. A signal inputted to the second client-side identification unit 313 is buffered in the second client-side gate unit 323. Further, a signal inputted to the first line-side identification unit 312 is buffered in the first line-side gate unit 322. A signal inputted to the second line-side identification unit 314 is buffered in the second line-side gate unit 324.

When outputting the connection information to the switch unit 330, the switch control unit 340 transmits an output command to a gate unit corresponding to the client port to be connected by the switch unit 330. The gate unit having received the output command outputs a buffered signal to the switch unit 330.

Next, an operation flow of the multiplex transmission system configured as described above will be described with reference to FIG. 3. First, in step S11, when there is new connection of a client device of one of the first multiplex transmission device 100 and the second multiplex transmission device 200, the process proceeds to step S12, and the extraction means described above extracts identification information from a signal inputted to a client port to which the client device is newly connected in step S11.

In subsequent step S13, if there is new connection in another one of the first multiplex transmission device 100 and the second multiplex transmission device 200, the process proceeds to step S14, and the extraction means described above extracts identification information from a signal inputted to a client port to which the client device is newly connected in step S13. After step S14, the process proceeds to step S15.

In step S15, the switch control unit 340 collates the identification information extracted in step S12 with the identification information extracted in step S14. Then, if these pieces of identification information do not match, the process returns to step S11. Whereas, in a case where these pieces of identification information match, the process proceeds to step S16.

In step S16, the switch control unit 340 outputs, to the switch unit 330, connection information designating connection between the client port to which the client device is newly connected in step S11 and the client port to which the client device is newly connected in step S13. Then, the switch unit 330 connects the client ports with each other to which the client devices are newly connected, in accordance with the connection information inputted from the switch control unit 340.

The inter-port connection method of the multiplex transmission system described above is a method for mutually connecting a plurality of client ports provided in each of the first multiplex transmission device 100 and the second multiplex transmission device 200, in a multiplex transmission system that multiplexes and transmits a plurality of signals between the first multiplex transmission device 100 and the second multiplex transmission device 200. Then, the inter-port connection method of the multiplex transmission system includes an extraction step and a switch control step.

The extraction step is a step of extracting identification information from signals inputted to the client ports of each of the first multiplex transmission device 100 and the second multiplex transmission device 200. The switch control step is a step of controlling the switch unit 330. Then, the switch control step includes a connection step. The connection step is a step of controlling the switch unit 330 to connect a client port of the first multiplex transmission device 100 with a client port of the second multiplex transmission device 200, on the basis of a result of collation between the identification information extracted from the signal inputted to the client port of the first multiplex transmission device 100 with the identification information extracted from the signal inputted to the client port of the second multiplex transmission device 200.

According to the multiplex transmission system configured as described above and the inter-port connection method of the multiplex transmission system, when a client device is connected to each of the two multiplex transmission devices, client ports connected with these client devices can be connected with each other by the switch unit 330 on the basis of identification information, even if the client ports connected with these client devices are any ports. Therefore, it is possible to prevent occurrence of a mistake on connection of a client device to the multiplex transmission device provided with a plurality of client ports, and to suppress occurrence of reconnection work on site.

Next, a modification of the multiplex transmission system according to the present embodiment will be described with reference to FIG. 4. In a configuration example illustrated in FIG. 4, the extraction means described above extracts address information of an M-plane signal as identification information, from a signal inputted to each client port. The M-plane signal is also referred to as an M-plane message, and is defined by ORAN-WG4 as a signal for providing various management functions for a client device by a monitoring control device. The address information of the M-plane message is, for example, IP address information. IP addresses used in the M-plane messages of the individual mobile carriers are considered to have different segments. The reason is that client devices are monitored by different monitoring control devices for each mobile carrier and cannot be monitored from monitoring control devices of different mobile carriers.

Therefore, in the configuration example illustrated in FIG. 4, the second multiplex transmission device 200 further includes a provider correspondence information storage unit 350. The provider correspondence information storage unit 350 stores, in advance, data related to a correspondence between a mobile carrier and a segment of an IP address used in an M-plane message of each mobile carrier. Then, the switch control unit 340 collates identification information extracted by the extraction means described above as follows. That is, first, the switch control unit 340 collates the IP address information serving as the identification information extracted by the extraction means described above with data stored in the provider correspondence information storage unit 350, and specifies a mobile carrier corresponding to a segment of the IP address information. Then, the switch control unit 340 collates the identification information by determining whether or not the mobile carriers specified from the segment of the IP address information match each other.

In this manner, the switch control unit 340 collates identification information extracted from a signal inputted to the client port of the first multiplex transmission device 100 with identification information extracted from a signal inputted to the client port of the second multiplex transmission device 200. Then, the switch control unit 340 controls the switch unit 330 to connect the client port of the first multiplex transmission device 100 with the client port of the second multiplex transmission device 200 on the basis of a collation result of the identification information. That is, the switch control unit 340 outputs, to the switch unit 330, connection information designating connection between the client port of the first multiplex transmission device 100 and the client port of the second multiplex transmission device 200, in which the mobile carriers specified from the segment of the IP address information match each other. Then, the switch unit 330 connects the client ports with each other in which the mobile carrier matches, in accordance with the connection information inputted from the switch control unit 340.

In this way, according to the multiplex transmission system having the configuration illustrated in FIG. 4 and the inter-port connection method of the multiplex transmission system as well, similarly to the configuration example illustrated in FIG. 2, when a client device is connected to each of the two multiplex transmission devices, client ports connected with these client devices can be connected with each other by the switch unit 330 on the basis of identification information even if the client ports connected with these client devices are any ports. Therefore, it is possible to prevent occurrence of a mistake on connection of a client device to the multiplex transmission device provided with a plurality of client ports, and to suppress occurrence of reconnection work on site.

Second Embodiment

Figure 5:
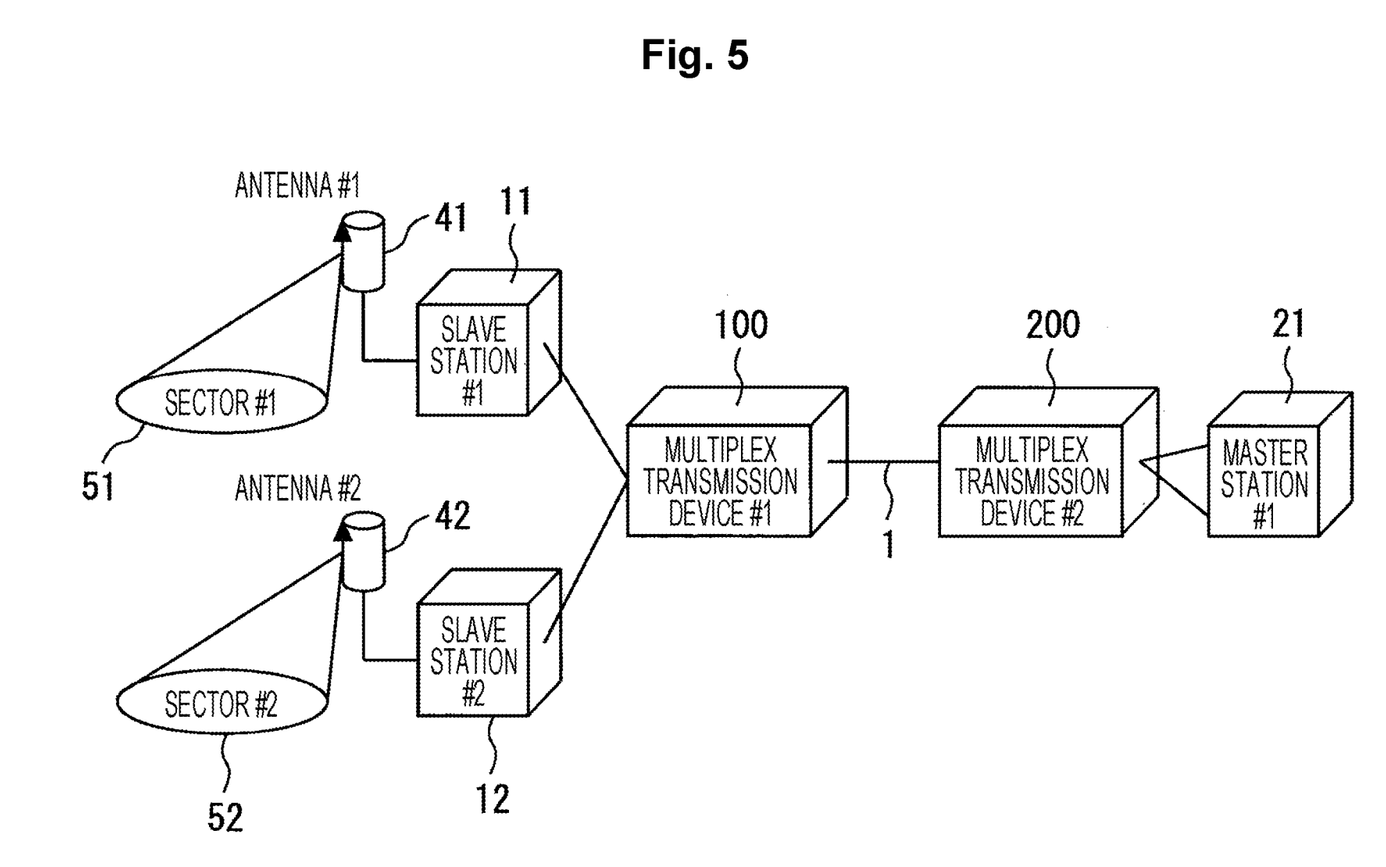
FIG. 5 is a diagram schematically illustrating an example of an overall configuration of a multiplex transmission system according to a second embodiment.
Figure 6:
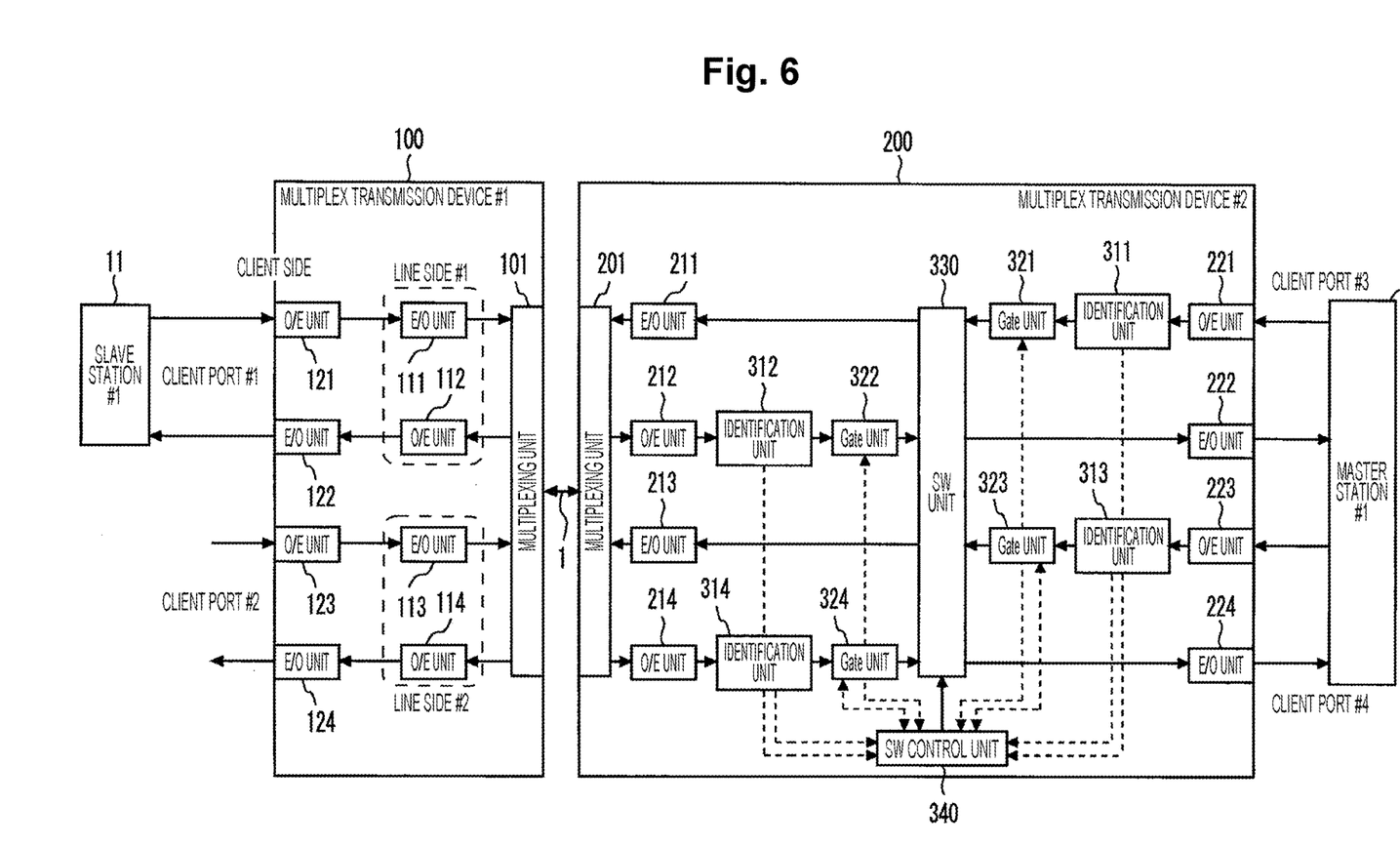
FIG. 6 is a block diagram illustrating a configuration of a multiplex transmission device included in the multiplex transmission system according to the second embodiment.

A second embodiment of the present disclosure will be described with reference to FIGS. 5 and 6. FIG. 5 is a diagram schematically illustrating an example of an overall configuration of a multiplex transmission system. FIG. 6 is a block diagram illustrating a configuration of a multiplex transmission device included in the multiplex transmission system.

Hereinafter, a multiplex transmission system and an inter-port connection method of the multiplex transmission system according to the second embodiment will be described focusing on differences from the first embodiment. Configurations for which the description is omitted are basically similar to those of the first embodiment. In the following description, configurations similar or corresponding to those in the first embodiment will be described with the same reference numerals as those used in the description of the first embodiment in principle.

As illustrated in FIG. 5, the multiplex transmission system according to the present embodiment includes a first multiplex transmission device 100 and a second multiplex transmission device 200. Similarly to the first embodiment, the multiplex transmission system of the present embodiment is a system that multiplexes and transmits a plurality of signals between the first multiplex transmission device 100 and the second multiplex transmission device 200. The first multiplex transmission device 100 and the second multiplex transmission device 200 are communicably connected by an optical fiber cable 1.

One or more slave stations are communicably connected to one of the first multiplex transmission device 100 and the second multiplex transmission device 200. One or more master stations are communicably connected to another one of the first multiplex transmission device 100 and the second multiplex transmission device 200. In the illustrated configuration example, a first slave station 11 and a second slave station, which are two slave stations, are connected to the first multiplex transmission device 100, and a first master station 21, which is one master station, is connected to the second multiplex transmission device 200. The first master station 21 communicates with each of the first slave station 11 and the second slave station 12 via the first multiplex transmission device 100, the optical fiber cable 1, and the second multiplex transmission device 200.

To the first slave station 11, a first antenna 41 is connected. By an area where the first antenna 41 can receive radio waves, a first sector 51 is formed. To the second slave station 12, a second antenna 42 is connected. By an area where the second antenna 42 can receive radio waves, a second sector 52 is formed. Usually, three or six sectors are often provided for one master station.

One master station is provided with signal input/output ports corresponding to individual sectors for which the master station is responsible for. For example, in a case where three sectors are provided for one master station, three input/output ports are provided in the master station. Then, each input/output port of the master station and the slave station of each sector need to be connected in one-to-one correspondence. Therefore, the first multiplex transmission device 100 connected to the slave station of each sector is provided with client ports of the same number as that of the sectors. Further, the second multiplex transmission device 200 is also provided with client ports of the same number as that of the input/output ports of the master station. For example, in a case where three sectors are provided for one master station as described above, three client ports are required for each of the first multiplex transmission device 100 and the second multiplex transmission device 200.

However, here, in order to facilitate understanding and illustration, it is assumed that the first sector 51 and the second sector 52, which are two sectors, are provided for one first master station 21. Therefore, in each of the first multiplex transmission device 100 and the second multiplex transmission device 200, two client ports are provided. For easy distinction, the two client ports provided in the first multiplex transmission device 100 are referred to as a first client port and a second client port, and the two client ports provided in the second multiplex transmission device 200 are referred to as a third client port and a fourth client port.

Next, configurations of the first multiplex transmission device 100 and the second multiplex transmission device 200 included in the multiplex transmission device of the present embodiment will be described with reference to FIG. 6. The master station and the slave station connected to the first multiplex transmission device 100 and the second multiplex transmission device 200 are collectively referred to as a client device similarly to the first embodiment. As described above, each of the first multiplex transmission device 100 and the second multiplex transmission device 200 is provided with a plurality of client ports to which the client device is connectable.

Similarly to the first embodiment, the first multiplex transmission device 100 includes the first client port and the second client port. Then, the first client port of the first multiplex transmission device 100 is provided with a first client-side O/E unit 121 and a first client-side E/O unit 122. Further, the second client port of the first multiplex transmission device 100 is provided with a second client-side O/E unit 123 and a second client-side E/O unit 124. The first multiplex transmission device 100 further includes a first line-side E/O unit 111, a first line-side O/E unit 112, a second line-side E/O unit 113, and a second line-side O/E unit 114, and a first multiplexing unit 101.

Further, the second multiplex transmission device 200 is also similar to the first embodiment, and the second multiplex transmission device 200 includes the third client port and the fourth client port. The third client port of the second multiplex transmission device 200 is provided with a third client-side O/E unit 221 and a third client-side E/O unit 222. Further, the fourth client port of the second multiplex transmission device 200 is provided with a fourth client-side O/E unit 223 and a fourth client-side E/O unit 224.

The second multiplex transmission device 200 further includes a third line-side E/O unit 211, a third line-side O/E unit 212, a fourth line-side E/O unit 213, and a fourth line-side O/E unit 214, and a second multiplexing unit 201. Also in the present embodiment, the second multiplex transmission device 200 further includes a first client-side identification unit 311, a first line-side identification unit 312, a second client-side identification unit 313, and a second line-side identification unit 314, and a first client-side gate unit 321, a first line-side gate unit 322, a second client-side gate unit 323, and a second line-side gate unit 324. Then, the second multiplex transmission device 200 further includes a switch unit 330 and a switch control unit 340.

The first client-side identification unit 311, the first line-side identification unit 312, the second client-side identification unit 313, and the second line-side identification unit 314 are extraction means that extract identification information from signals inputted to the client ports of each of the first multiplex transmission device 100 and the second multiplex transmission device 200. The identification information extracted by the extraction means is outputted to the switch control unit 340.

In the multiplex transmission system according to the present embodiment, the extraction means described above extracts a band sector identifier (bandsector ID) as identification information, from a signal inputted to each client port. The band sector identifier is a type of identifier defined in ORAN-WG4. The band sector identifier is an identifier uniquely representing a frequency band and a sector. Different sectors have different band sector identifiers. Therefore, the band sector identifier used for communication between the first slave station 11 corresponding to the first sector 51 and the first master station 21 is different from the band sector identifier used for communication between the second slave station 12 corresponding to the second sector 52 and the first master station 21.

The switch control unit 340 collates identification information extracted from a signal inputted to the client port of the first multiplex transmission device 100 with identification information extracted from a signal inputted to the client port of the second multiplex transmission device 200. Then, the switch control unit 340 controls the switch unit 330 to connect the client port of the first multiplex transmission device 100 with the client port of the second multiplex transmission device 200 on the basis of a collation result of the identification information. As described above, the band sector identifier used for communication between the first slave station 11 and the first master station 21 is different from the band sector identifier used for communication between the second slave station 12 and the first master station 21. Therefore, the switch control unit 340 outputs, to the switch unit 330, connection information designating connection between the client port of the first multiplex transmission device 100 and the client port of the second multiplex transmission device 200, in which the band sector identifier serving as the identification information matches. Then, the switch unit 330 connects the client ports with each other in which the band sector identifier matches, in accordance with the connection information inputted from the switch control unit 340.

Further, the inter-port connection method of the multiplex transmission system according to the present embodiment is also similar to that described in the first embodiment. That is, the inter-port connection method of the multiplex transmission system according to the present embodiment is a method for mutually connecting a plurality of client ports provided in each of the first multiplex transmission device 100 and the second multiplex transmission device 200, in a multiplex transmission system that multiplexes and transmits a plurality of signals between the first multiplex transmission device 100 and the second multiplex transmission device 200. Then, the inter-port connection method of the multiplex transmission system includes an extraction step and a switch control step.

The extraction step is a step of extracting identification information from signals inputted to the client ports of each of the first multiplex transmission device 100 and the second multiplex transmission device 200. The switch control step is a step of controlling the switch unit 330. Then, the switch control step includes a connection step. The connection step is a step of controlling the switch unit 330 to connect a client port of the first multiplex transmission device 100 with a client port of the second multiplex transmission device 200, on the basis of a result of collation between the identification information extracted from the signal inputted to the client port of the first multiplex transmission device 100 with the identification information extracted from the signal inputted to the client port of the second multiplex transmission device 200.

Also in the multiplex transmission system configured as described above and the inter-port connection method of the multiplex transmission system, similarly to the first embodiment, when a client device is connected to each of the two multiplex transmission devices, client ports connected with these client devices can be connected with each other by the switch unit 330 on the basis of identification information, even if the client ports connected with these client devices are any ports. Therefore, it is possible to prevent occurrence of a mistake on connection of a client device to the multiplex transmission device provided with a plurality of client ports, and to suppress occurrence of reconnection work on site.

Note that, in each of the above embodiments, the description has been given to a configuration example in a case where the switch unit 330 and the switch control unit 340 are provided in the second multiplex transmission device 200 to which the first master station 21 and the like are connected. However, a place where the switch unit 330 and the switch control unit 340 are provided is not limited to the second multiplex transmission device 200. One or both of the switch unit 330 and the switch control unit 340 may be provided in the first multiplex transmission device 100. In a case where the switch unit 330 and the switch control unit 340 are separately provided in the first multiplex transmission device 100 and the second multiplex transmission device 200, the connection information from the switch control unit 340 is transmitted to the switch unit 330 via the optical fiber cable 1, for example. Further, in a configuration example including an identification unit and a gate unit, some or all of them may be provided in the first multiplex transmission device 100.

Further, the multiplex transmission device constituting the multiplex transmission system and the inter-port connection method of the multiplex transmission system according to the present disclosure can also be implemented by executing preset processing with a processor executing a program stored in a memory, to cause hardware and software to cooperate with each other. Then, the program for implementing the device and the method according to the present disclosure can be recorded in advance in an information recording medium. Further, the program for implementing the device and the method according to the present disclosure can also be provided through a communication network.

INDUSTRIAL APPLICABILITY

The present disclosure can be used for a multiplex transmission system that multiplexes and transmits a plurality of signals between a first multiplex transmission device and a second multiplex transmission device, and for an inter-port connection method of a multiplex transmission system for mutually connecting a plurality of client ports provided in each of the first multiplex transmission device and the second multiplex transmission device.

REFERENCE SIGNS LIST

1 Optical fiber cable
11 First slave station
12 Second slave station
21 First master station
22 Second master station
31 First monitoring control device
32 Second monitoring control device
41 First antenna
42 Second antenna
51 First sector
52 Second sector
100 First multiplex transmission device
101 First multiplexing unit
111 First line-side E/O unit
112 First line-side O/E unit
113 Second line-side E/O unit
114 Second line-side O/E unit
121 First client-side O/E unit
122 First client-side E/O unit
123 Second client-side O/E unit
124 Second client-side E/O unit
200 Second multiplex transmission device
201 Second multiplexing unit
211 Third line-side E/O unit
212 Third line-side O/E unit
213 Fourth line-side E/O unit
214 Fourth line-side O/E unit
221 Third client-side O/E unit
222 Third client-side E/O unit
223 Fourth client-side O/E unit
224 Fourth client-side E/O unit
311 First client-side identification unit
312 First line-side identification unit
313 Second client-side identification unit
314 Second line-side identification unit
321 First client-side gate unit
322 First line-side gate unit
323 Second client-side gate unit
324 Second line-side gate unit
330 Switch unit
340 Switch control unit
350 Provider correspondence information storage unit

The invention claimed is:

1. A multiplex transmission system for multiplexing and transmitting a plurality of signals between a first multiplex transmission device and a second multiplex transmission device, wherein each of the first multiplex transmission device and the second multiplex transmission device includes a plurality of client ports to which a client device is connectable, and either one of the first multiplex transmission device and the second multiplex transmission device further includes:

a switch unit configured to connect any one of a plurality of the client ports of the first multiplex transmission device with any one of a plurality of the client ports of the second multiplex transmission device;

an extraction unit, including one or more processors, configured to extract identification information from a signal inputted to each of the client ports of each of the first multiplex transmission device and the second multiplex transmission device; and a switch control unit, including one or more processors, configured to;

determine whether the identification information extracted from a first signal inputted to a first client port of the first multiplex transmission device matches the identification information extracted from a second signal inputted to a second client port of the second multiplex transmission device, in response to determining that the identification information extracted from the first signal matches the identification information extracted from the second signal, control the switch unit to connect the first client port of the first multiplex transmission device with the second client port of the second multiplex transmission device, and in response to determining that the identification information extracted from the first signal does not match the identification information extracted from the second signal, wait for new client device connections without controlling the switch unit to connect the first client port with the second client port.

2. The multiplex transmission system according to claim 1, wherein the extraction unit is configured to extract a component carrier identifier as the identification information, from a signal inputted to each of the client ports of each of the first multiplex transmission device and the second multiplex transmission device.

3. The multiplex transmission system according to claim 1, wherein the extraction unit is configured to extract address information included in an M-plane signal as the identification information, from a signal inputted to each of the client ports of each of the first multiplex transmission device and the second multiplex transmission device.

4. The multiplex transmission system according to claim 1, wherein the extraction unit is configured to extract, as the identification information, from a signal inputted to each of the client ports of each of the first multiplex transmission device and the second multiplex transmission device, a band sector identifier that identifies both a frequency band and an area of an antenna coverage.

5. An inter-port connection method of a multiplex transmission system, the inter-port connection method being for connecting a plurality of client ports provided in a first multiplex transmission device with a plurality of client ports provided in a second multiplex transmission device in the multiplex transmission system that multiplexes and transmits a plurality of signals between the first multiplex transmission device and the second multiplex transmission device, the inter-port connection method comprising:

an extraction step of extracting identification information from a signal inputted to each of the client ports of each of the first multiplex transmission device and the second multiplex transmission device; and a switch control step of controlling a switch unit provided in either one of the first multiplex transmission device and the second multiplex transmission device and configured to connect any one of a plurality of the client ports of the first multiplex transmission device with any one of a plurality of the client ports of the second multiplex transmission device, wherein the switch control step includes a connection step comprising:

determining whether the identification information extracted from a first signal inputted to a first client port of the first multiplex transmission device matches the identification information extracted from a second signal inputted to a second client port of the second multiplex transmission device, in response to determining that the identification information extracted from the first signal matches the identification information extracted from the second signal, controlling the switch unit to connect the first client port of the first multiplex transmission device with the second client port of the second multiplex transmission device, and in response to determining that the identification information extracted from the first signal does not match the identification information extracted from the second signal, waiting for new client device connections without controlling the switch unit to connect the first client port with the second client port.

6. The inter-port connection method of the multiplex transmission system according to claim 5, wherein the extraction step comprises extracting a component carrier identifier as the identification information, from a signal inputted to each of the client ports of each of the first multiplex transmission device and the second multiplex transmission device.

7. The inter-port connection method of the multiplex transmission system according to claim 5, wherein the extraction step comprises extracting address information included in an M-plane signal as the identification information, from a signal inputted to each of the client ports of each of the first multiplex transmission device and the second multiplex transmission device.

8. The inter-port connection method of the multiplex transmission system according to claim 5, wherein the extraction step comprises extracting, as the identification information, from a signal inputted to each of the client ports of each of the first multiplex transmission device and the second multiplex transmission device, a band sector identifier that identifies both a frequency band and an area of an antenna coverage.

* * * * *